April 10, 1951 G. C. SZIKLAI ET AL 2,548,829

COLOR TELEVISION SYSTEM

Filed March 27, 1948 3 Sheets-Sheet 1

INVENTORS
GEORGE C. SZIKLAI
MILTON ROSENBERG
BY [signature]
ATTORNEY

April 10, 1951 G. C. SZIKLAI ET AL 2,548,829

COLOR TELEVISION SYSTEM

Filed March 27, 1948 3 Sheets-Sheet 2

INVENTORS
GEORGE C. SZIKLAI
MILTON ROSENBURG
BY [signature]
ATTORNEY

April 10, 1951 G. C. SZIKLAI ET AL 2,548,829

COLOR TELEVISION SYSTEM

Filed March 27, 1948 3 Sheets-Sheet 3

INVENTORS
GEORGE C. SZIKLAI
MILTON ROSENBERG
BY [signature]
ATTORNEY

Patented Apr. 10, 1951 2,548,829

UNITED STATES PATENT OFFICE 2,548,829

COLOR TELEVISION SYSTEM

George C. Sziklai, Princeton, and Milton Rosenberg, Trenton, N. J., assignors to Radio Corporation of America, a corporation of Delaware Application March 27, 1948, Serial No. 17,564

5 Claims. (Cl. 178—5.4)

Figure 1:
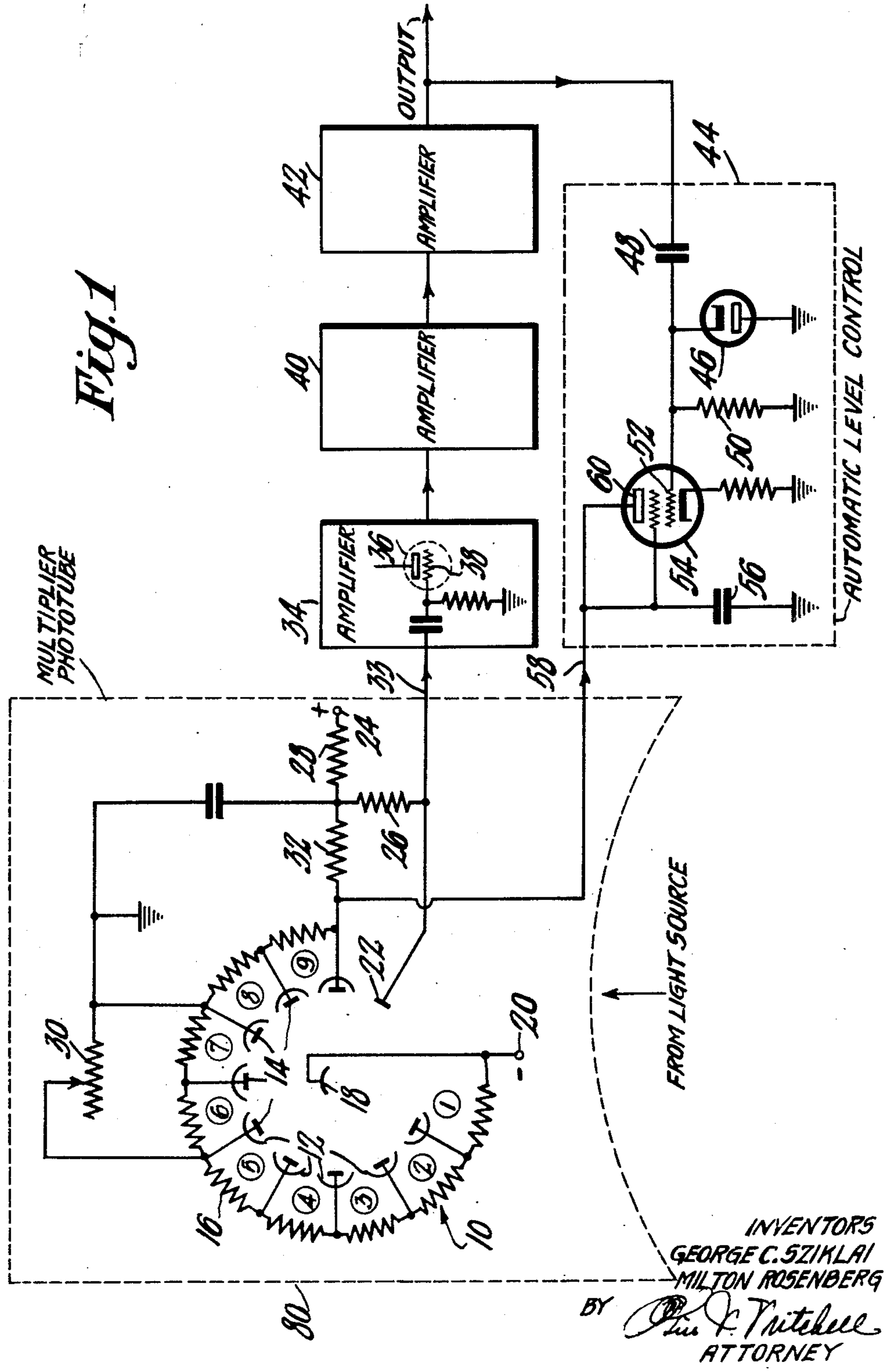

The present invention relates to television systems of the type in which one or more trains of video signals representative of an optical image are developed by the process known as "flying-spot" scanning.

The present application is a continuation of our earlier copending application, Serial No. 725,782, filed June 5, 1947, now abandoned.

In a system of the kind to which the invention is applicable, the image to be scanned is illuminated by the moving spot of light produced when the electron scanning beam of a cathode ray tube is deflected so as to trace an image raster on the luminescent screen or target area of the tube. This moving light spot is then focused upon the subject matter to be televised, and, in accordance with the optical characteristics of such subject matter, the light passing through or reflected therefrom will contain information which may be employed to initiate the production of one or more trains of video signals. The latter, after being combined with suitable sync and blanking signals in a manner well known in the art, may then be employed to control the reconstitution of an optical image representing the scanned subject matter at a desired receiving or monitoring location.

A "flying-spot" scanning arrangement, such as outlined above, is particularly adapted for incorporation in color television apparatus of the all-electronic type wherein a plurality of trains of video signals may be simultaneously transmitted and then utilized at the receiver to recreate the transmitted image in substantially its natural color as disclosed in a copending United States patent application of R. D. Kell and G. C. Sziklai, Serial No. 716,256, filed December 14, 1946. In the above mentioned application, there is disclosed a color television system of the type above set forth and which in addition employs, in a preferred embodiment, the "flying-spot" method of scanning a subject. Essentially, the system therein described includes a cathode ray tube, or kinescope, on the screen of which a spot of light is produced. Upon deflection of the electron beam, this light spot will trace an image raster, the light from the latter being focused through a lens system upon the optical image to be transmitted. This subject may, for example, be presented by a color motion picture film, or a color transparency.

In order to reproduce a television image in substantially its true or natural color by the so-called additive method of simultaneous transmission, signals representative of the image in each of any selected number of primary or component colors (which may be three in number for a tri-color system, for example) are transmitted simultaneously. When these component color signals are combined at a receiving point by means of a scanning operation which is similar to that at the transmitter, the resultant image will appear substantially in its natural color. Each train of image signals thus represents the scanned optical image in one of its component colors, and the number of trains of such signals corresponds to the number of component colors into which the image is analyzed.

Light rays from the optical image are condensed and then divided by a system of selective reflectors. The divided light beams are respectively collected by some suitable light-responsive devices (such as phototubes) which convert the varying light rays from the optical image into trains of component-color video signals. These trains of component-color video signals constituting the output of the phototubes are then combined with suitable blanking and sync signals and utilized to modulate a carrier wave for transmission.

From the above, it will be appreciated that light representative of each point in the subject as measured by the light of each component color in the subject will be directed to the different phototubes, so that the instantaneous current flowing in each phototube will be a measure of the brilliance of that component color represented by the point on the subject which is instantaneously illuminated by the cathode ray beam. As the cathode ray beam traces the complete raster, it will be apparent that each point of the subject is illuminated in sequence, so that all points thereof will cause the production of signal currents in one or more of the phototubes. In this manner, the subject is explored in a point-for-point manner by a light spot representing the instantaneous position of the cathode ray scanning beam as it traces the image raster on the end wall of the tube. Accordingly, trains of video signals representing the optical image in each of its component colors simultaneously flow in the different transmission channels connected to the several phototubes. These signals can then be utilized at receiving points to modulate the scanning beams of appropriate cathode ray image-producing tubes, such as kinescopes, which cause different component-color images to respectively appear on the different tubes as a monochrome version of one color. The light image appearing on each tube may then be passed through a proper component-color filter, so that by bringing together the various images for the different component colors in a registered manner, the image of the original subject is recreated in color.

In order to provide a high value of signal output in each of the component-color transmission channels, it has been proposed to employ phototubes of the multiplier type in the path of each of the component-color light beams. This arrangement is set forth, for example, in an article entitled "Simultaneous All-Electronic Color Television" appearing in the "RCA Review" for December 1946, on pages 459 and 468 inclusive. These multiplier-type phototubes may, for example, be of the type known as the 931A, which includes nine multiplier stages.

During the scanning of color transparencies and color motion picture film, in particular, wide variations are frequently encountered in the amount of light which is received by the individual phototubes. For optimum operation of the transmitter circuits, however, and also for a high degree of definition in the reproduced image, it is desirable that the output voltage level of the amplifier in each component-color channel be held within predetermined limits. The permissible upper limit is frequently exceeded, however, due to the presence of extreme or extended highlights in the slide, or film, being scanned, and also by an abrupt transition from a predominantly dark scene to one which contains large light areas.

It has heretofore been desirable to compensate for abnormal variations in light output due to these variations in the characteristics of the scanned image by means of a manually-operated control, or controls, which acts to vary the video signal output levels of the component-color channels. This control might take the form, for example, of an adjustable power supply for varying the voltage applied in common to the multiplier phototubes, and hence the output level of all three component-color signal channels simultaneously. Alternatively, or as a supplementary control, the supply voltage for the phototube multiplier in each component-color channel might be varied individually by a separate potentiometer in order to provide a desired color balance. In either case, however, such a control has hitherto required manual operation, and this is frequently inconvenient due to the necessity or desirability of making adjustments in other sections of the television apparatus at the same time. Furthermore, it requires constant attention on the part of an operator to see that a predetermined output level for the video amplifiers is not exceeded.

In accordance with one feature of the present invention, means are provided for accomplishing the above results automatically. In one embodiment, which is suitable for use either in the color television system above set forth, or in any electro-optical system in which light variations are transformed into electrical variations, a system is employed which is herein designated as an A. L. C., or automatic level control. In this A. L. C. system, as applied to a single light-responsive element or phototube of the multiplier type, an amplifier having one or more stages is connected to receive the output of the multiplier phototube.

In order automatically to control the output level of the amplifier, a control voltage variation is fed back to the multiplier phototube from the output of the amplifier. This control voltage variation is obtained by rectifying a portion of the amplifier output, the voltage thus rectified being applied to control the conduction of an electron discharge tube. This latter tube is connected in shunt with one or more of the dynodes of the multiplier phototube. Since this electron discharge tube is connected between ground and a point of positive potential on the multiplier phototube, it will be apparent that a variation in the internal resistance of the electron discharge tube will vary the shunting effect of the tube and thus vary effective positive potentials of the multiplier phototube dynodes which the electron discharge tube shunts. Accordingly, an increase in the normal output of the multiplier phototube due to an increase in the brilliance of the light received thereby will cause an increase in the normal output of the amplifier and hence a corresponding increase in the magnitude of the rectified voltage. Inasmuch as this rectified voltage is applied as a bias potential to the control electrode of the above-mentioned electron discharge tube, it follows that such an increase in amplifier output will oppose the bias on the tube and hence decrease its internal resistance. This results in a greater shunting action, which lowers the positive potential on the particular dynodes of the multiplier phototube which the tube is shunting. A reduction in the secondary emission ratio from this part of the phototube is thus brought about, together with a corresponding decrease in its overall gain.

One object of the present invention, therefore, is to provide novel means for automatically controlling the electrical output of an electro-optical system in the face of variations in the amount of illumination received by the light-sensitive element thereof.

Another object of the present invention is to provide a novel system for automatically controlling the output level of a "flying-spot" scanner forming part of a television transmitting system.

A still further object of the invention is to provide novel means whereby the gain of a phototube of the multiplier type may be automatically controlled in response to variations in the brilliance of the light received by the phototube.

An additional object of the invention is to provide novel means whereby the signal output from a phototube of the multiplier type may be automatically controlled by utilizing a portion of the output of the phototube to establish a control voltage variation which may be fed back to the phototube to decrease the accelerating voltage on at least one dynode thereof and hence the overall gain of the phototube.

Figure 2:
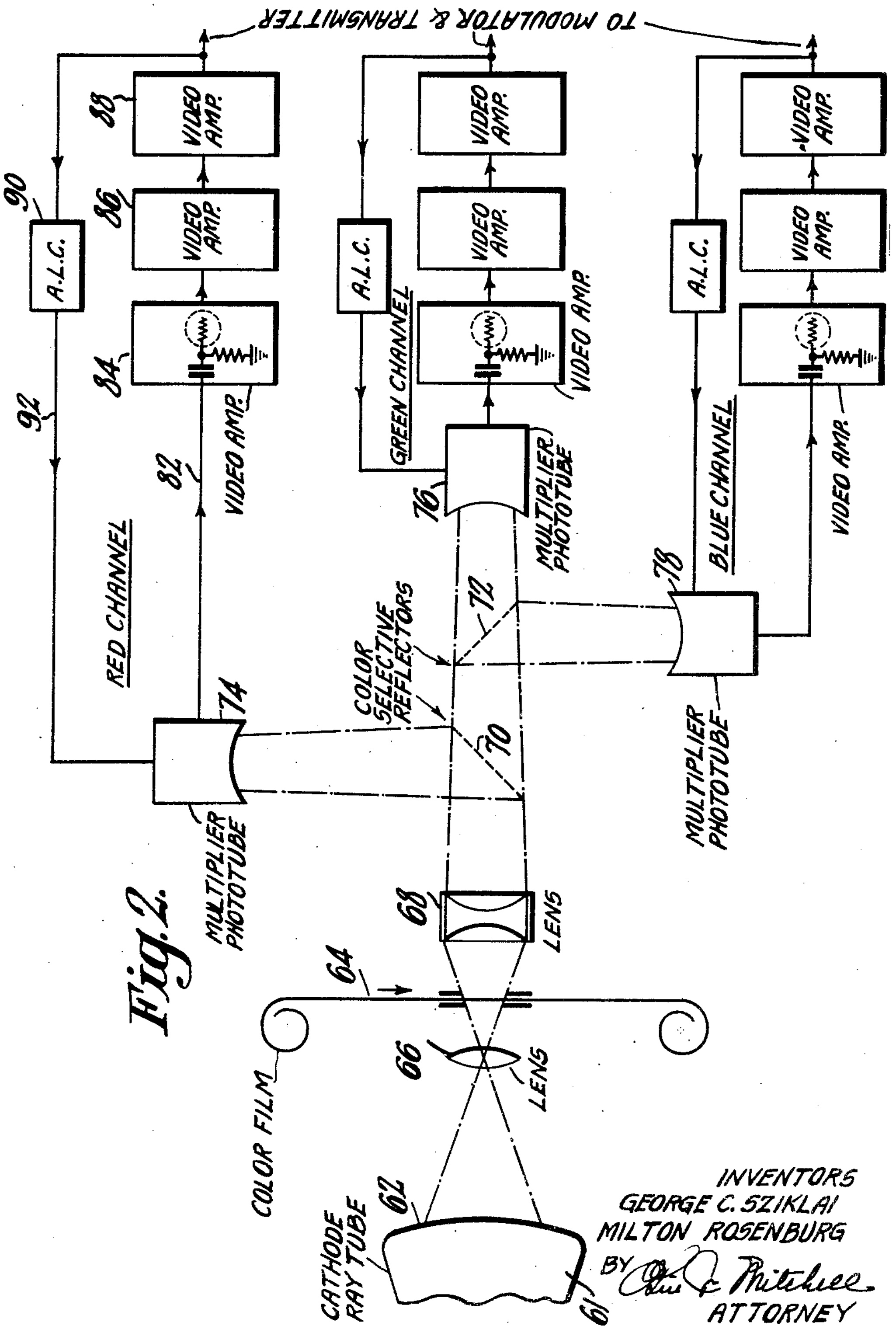
Figure 3:
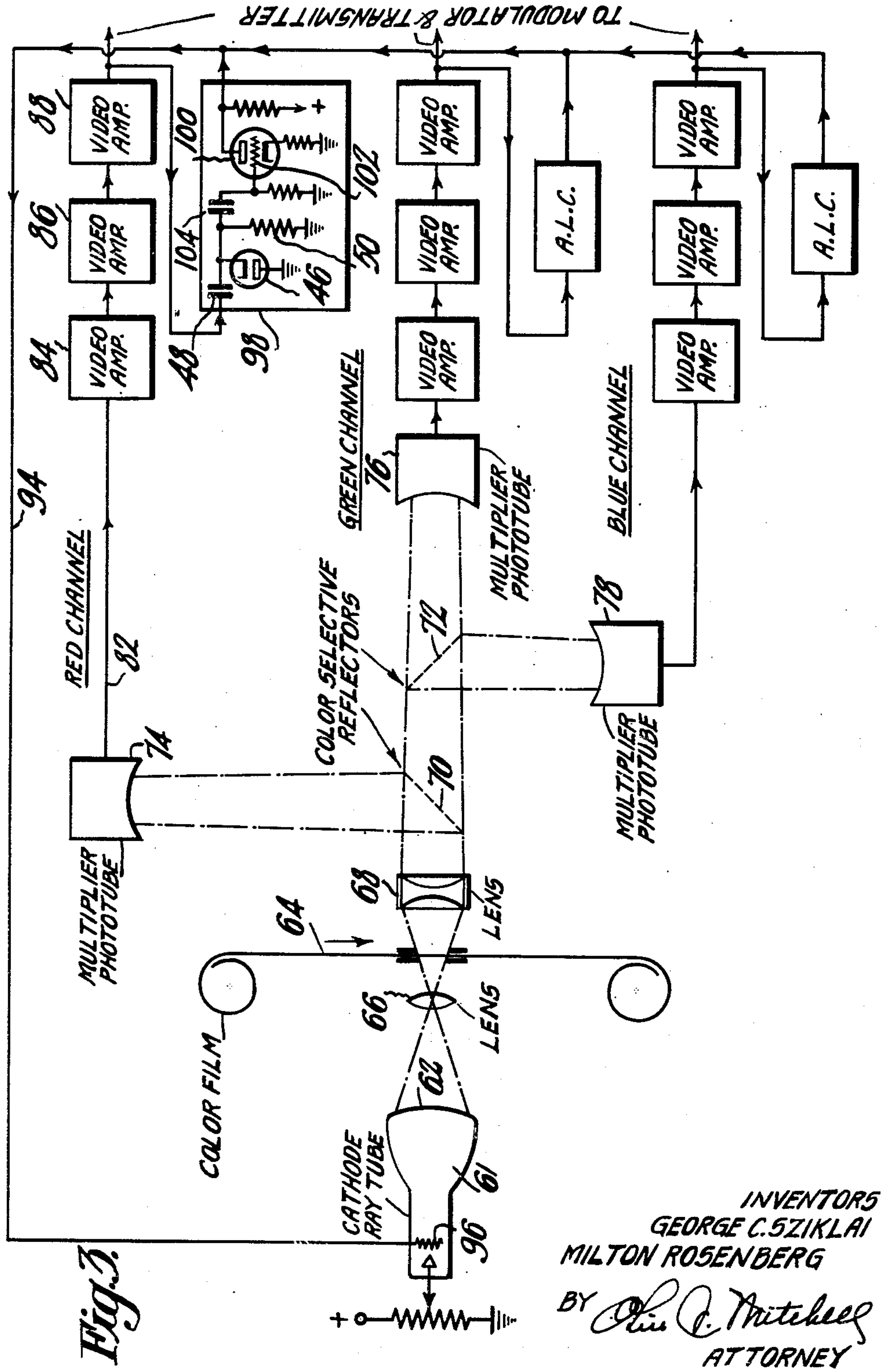

Other objects and advantages will be apparent from the following description of a preferred form of the invention and from the drawings, in which:

Fig. 1 is a schematic diagram of a preferred form of automatic level control system in accordance with the present invention;

Fig. 2 is a schematic illustration showing the automatic level control system of Fig. 1 applied to each of the component-color signal channels of a simultaneous color television transmitting system utilizing a "flying-spot" scanner; and Fig. 3 is a modification of Fig. 2 in which the individual automatic level control systems of Fig. 2 are modified in such a manner that their outputs may be combined and utilized to control the intensity of the electron scanning beam of the cathode ray tube.

Referring first to Fig. 1 of the drawings, there is shown a preferred form of automatic level control, A. L. C., circuit as applied to one type of electro-optical system. This system may include a phototube of the multiplier type, generally indicated in the drawing by the reference numeral 10. The phototube 10 may, for example, consist of nine multiplier stages, and hence possess nine dynodes, identified in the drawing by the circled numerals 1 through 9. While the phototube 10 has been shown more or less schematically, it will be understood that each dynode includes a directing electrode 12 and a secondary emitting electrode 14. Between each of the dynodes of the phototube 10 is an impedance 16.

The cathode 18 of the phototube 10 is connected to the negative terminal 20 of a source of potential (not shown), while the anode, or collector electrode, 22 is connected to the positive terminal 24 of the potential source through two resistors 26 and 28. In this manner, each of the dynodes 1 through 9 is maintained progressively more positive in a direction from the cathode 18 to the anode 22. Inasmuch as multiplier phototubes of the type described are well known in the art, a further description of the element 10 is not believed to be necessary. Such a light-responsive member is shown, for example, in U. S. Patent No. 2,404,098, issued July 16, 1946, to Otto H. Schade.

As illustrated in the drawing, dynode #7 is connected directly to ground or a point of constant potential. Dynode #5 is likewise connected to this point of constant potential through a potentiometer 30. Hence, by selectively varying the potentiometer 30, the negative voltage on dynode #5 may be decreased in the direction of ground potential, this potentiometer 30 constituting the manually-operated gain control mentioned above. It permits an adjustment of the voltage output of the multiplier phototube 10 through a variation in the voltage applied between dynodes #1 and #5 and hence the overall gain of the phototube.

Dynode #9 is connected, as illustrated, through the resistors 32 and 28 to the positive terminal 24 of the potential source. The resistor 32, however, is chosen to be of higher value than a resistor 26, so that the anode of phototube 10 is normally maintained at a higher positive potential than the dynode #9. The voltage output of the phototube 10, as developed across the load resistor 26, is applied over a conductor 33 to an amplifier 34. Amplifier 34 may be of any well-known type which includes an electron discharge device 36 having a control electrode 38. The output of the phototube 10 is preferably applied in customary fashion to this control electrode 38 of tube 36. Since the details of amplifier 34 form no part of the present invention, the amplifier has been illustrated in the drawing by block diagram.

The output of amplifier 34 is applied to two further amplifiers 40 and 42, the output of amplifier 42 being a voltage variation which extends in a direction of positive polarity upon the reception of light by the cathode 18 of phototube 10. This will be apparent when it is appreciated that the output of the phototube 10, as developed across the output resistor 26, will extend in a negative direction. This negative voltage variation is successively amplified by each of the amplifiers 34, 40 and 42 so that its polarity is reversed in the output of each.

In accordance with one form of the present invention, an automatic level control, or A. L. C., circuit 44 is provided in the system of Fig. 1. This automatic level control circuit 44 includes a diode rectifier tube 46 to the cathode of which a portion of the output of amplifier 42 is applied through the condenser 48. Since the output of amplifier 42 is, as above stated, a voltage variation extending in a direction of positive polarity, the application of this voltage variation to the cathode of diode 46 will cause the latter to conduct, and the flow of current therethrough will charge condenser 48 positively relative to ground. This positive charge on condenser 48 will leak off to ground through a resistor 50, and hence the time constant of the condenser 48 and resistor 50 will determine the operating period of the automatic level control circuit 44 in a manner which will hereafter become apparent.

Since the cathode of diode 46 is connected to receive the output of amplifier 42, it will be seen that this diode in effect acts as a peak rectifier to establish a voltage on condenser 48 which is a measure of the maximum amplitude of the output of amplifier 42 and hence of the output of phototube 10 as applied to the amplifier 34. This voltage on condenser 48 is applied to the control electrode 52 of a grid-controlled electron discharge tube 54, which may comprise a tetrode as illustrated. The anode and screen grid of tube 54 are joined together and connected to ground through a condenser 56. The condenser 56 serves to remove fast variations in the video signal. The speed of control will depend on the time constant condenser 48 and resistor 50 and the condenser 56 in combination with the resistor 32. The plate of the tube is also connected to dynode #9 of the phototube 10 by means of a conductor 58. Accordingly, the internal resistance of tube 54 in effect is connected between dynode #9 of phototube 10 and ground. Hence, when tube 54 conducts, the positive potential on its anode 60 is lowered, as well as the positive potential on dynode #9 of phototube 10. This decrease in potential on anode 60 of tube 54 is proportional to the internal resistance of the tube as determined by the voltage applied to its control electrode 52.

It will now be seen that an increase in the light falling on photocathode 18 of the phototube 10 will normally cause an increase in the voltage output of the amplifier 42. However, this normal increase in voltage output of amplifier 42 is applied through the condenser 48 of the automatic level control circuit 44 to the control electrode 52 of the control tube 54 so as to increase the conductivity of this tube. The latter in turn results in a decrease in the anode potential of the tube, together with a consequent decrease in the positive potential applied to dynode #9 of phototube 10 from the source terminal 24. As a consequence, the secondary emission ratio of dynodes #8 and 9 is decreased which in turn decreases the number of electrons collected by the anode 22 of the phototube. This, of course, results in a decrease in the output voltage of the phototube 10 and hence a proportional decrease in the output voltage of the amplifier 42. Thus, the automatic level control circuit 44 acts to compensate for excessive increases in the output of the amplifier 42 as a result of abnormal increases in the illumination received by the photocathode 18 of phototube 10.

In Fig. 2 is shown one manner in which the automatic level control circuit 44 of Fig. 1 may be utilized in connection with a simultaneous color television transmitting system of the type employing "flying-spot" scanning. The general details of such a system are set forth in the above-mentioned article entitled "Simultaneous All-Electronic Color Television" and hence will not be repeated here. However, it may be said that Fig. 2 includes an image-producing cathode ray tube or kinescope 61 of the type adapted to produce a brilliant spot of light on its screen 62. This image producing tube 61 may, for example, be of the projection type shown and described in an article entitled "Development of the Projection Kinescope" in the "Proceedings of the Institute of Radio Engineers" for August 1937, beginning on page 937. Since its application to this invention requires that the spot of light produced on the screen 62 of tube 61 remain at uniform brilliance to form a scanning raster, it follows that the beam of the tube 61 is unmodulated.

The scanning raster produced on the screen 62 is projected and focused on a transparent image, which may take the form, for example, of a color motion picture film 64. The projection and focusing of the scanning raster upon the film 64 is accomplished by means of an optical system represented, for example, by a lens 66.

The light rays which pass through the color film 64 are then directed through a condenser lens 68, the latter serving to concentrate the divergent rays which pass through the color film 64.

The light rays from the lens 68 are then intercepted by a plurality of color-selective reflectors 70 and 72 which are positioned along the axis of the light rays and adjusted at an angle such that a portion of the light from the color film 64 will fall upon three multiplier-type phototubes 74, 76 and 78. The color-selecting reflectors 70 and 72 act to break up the light rays from the lens 68 into their component colors. For example, the color-selective reflector 70 is designed to reflect the long-wavelength light rays (or the red light end of the color spectrum) toward the multiplier phototube 74. The short-wavelength colors of the light rays from lens 68, or, in other words, the blue light end of the color spectrum, are reflected from the reflector 72 to the multiplier phototube 78. The portion of the light rays which pass through the color-selective reflectors 70 and 72, or, in other words, those representing the green portion of the color spectrum, fall upon the multiplier phototube 76. Thus, it will be appreciated that light representative of each point in the image in the color film 64, as measured by the light of each component color in the image, will be directed to the respective phototubes 74, 76 and 78, and that the instantaneous output of each phototube will be a measure of the brilliance of one component color making up that point on the color film image which is instantaneously illuminated by the cathode ray beam of tube 61 as it is positioned in the raster formed on the screen 62. Inasmuch as a color television system in accordance with the preceding description is set forth in the above-mentioned Kell and Sziklai patent application, no further details thereof are deemed necessary herein. However, for a further discussion and description of an alternative form of arrangement for separating light into its component colors by means of a color-selective reflector system, reference is made to a copending United States patent application of Alfred C. Schroeder, Serial No. 731,647, filed February 28, 1947. Furthermore, while the details of the reflectors 70 and 72 form no part of the present invention, nevertheless reference might be made to an article by G. L. Dimmick entitled "A New Dichroic Reflector and Its Application to Photocell Monitoring Systems," beginning on page 36 of the "Journal of the Society of Motion Picture Engineers" for January 1942, this article setting forth one possible mode of construction suitable for the elements 70 and 72 of Fig. 2.

Each of the phototube multipliers 74, 76 and 78 illustrated by block diagram in Fig. 2 may comprise an arrangement such as set forth in Fig. 1 within the broken lines 80. In other words, each of the multiplier phototubes 74, 76 and 78 in Fig. 2 may comprise the multiplier phototube 10, as illustrated in Fig. 1, together with its associated potential source connected to the terminals 20 and 24 and also its associated resistor elements 26, 28, 30 and 32. The output of the phototube 74 of Fig. 2, for example, as applied over the conductor 82, may correspond to the output of the multiplier phototube unit 80 of Fig. 1, as applied over the conductor 33. In a similar fashion, the amplifiers 34, 40 and 42 of Fig. 1 may be the counterparts of the video amplifiers 84, 86 and 88 of Fig. 2. A portion of the output of the video amplifier 88 is applied to an automatic level control, or A. L. C. circuit 90 which may be similar to the automatic level control circuit 44 of Fig. 1, and the output of the circuit 90 applied to the multiplier phototube 74 over a conductor 92 corresponding to a similar conductor 58 in Fig. 1.

In a fashion similar to the above, each of the green and blue channels of Fig. 2 is similarly provided with an automatic level control circuit which may be of the type shown in Fig. 1. In this manner, individual compensation is provided for each of the three component-color signal channels of Fig. 2, thus eliminating the necessity for actuating the potentiometer 30 of Fig. 1 in order to vary the output of the individual phototubes. However, the potentiometer 30 of Fig. 1 may be retained in the system to provide a supplementary adjustment, or to select the range through which the automatic level control circuit 44 of Fig. 1 is effective.

The time constant of the RC combination 48 and 50 and also of the RC combination 32 and 56 should preferably be chosen so that the automatic level control circuit 90 of Fig. 2 will have an operating period, for example, between one-quarter of a second and one-sixtieth of a second. This prevents objectionable distortion in the reproduced image, and at the same time does not operate with such speed as to cause changes in the gain of the multiplier phototube in response to normal changes in light intensity between normally contrasting areas of a particular optical image.

In Fig. 3 is shown a modification of the system of Fig. 2 in which the respective outputs of the three individual automatic level control circuits are combined and applied over a common conductor 94 to the control grid 96 of the cathode ray tube 61 so as to vary the intensity of the scanning beam of tube 61 and hence the brilliance of the light spot produced on the screen 62. This variation is in direct proportion to the combined voltage outputs of the multiplier phototubes 74, 76 and 78, which in turn represents the average density of the color film image 64. Accordingly, as the density of the color film image 64 increases, the control voltage variation applied over conductor 94 to the control grid 96 of tube 61 is made to become more positive (or less negative) relative to the cathode of tube 61 to thereby increase the intensity of the cathode ray scanning beam and hence the brilliance of the light spot produced on the screen 62.

In order to produce the above results, the automatic level control circuit 98, which receives a portion of the output of the video amplifier 88 in the red channel of the system of Fig 3, is similar to the automatic level control circuit 44 as shown in Fig. 1. A control tube 100 having a control grid 102 is connected to the cathode of rectifier tube 46 through a coupling condenser 104. The voltage output of amplifier 88, in Fig. 3, is applied to the control grid 102 of the control tube 100 in the same manner that the output of amplifier 42 is applied to the control electrode 52 of tube 54 in Fig. 1. Accordingly, the voltage output of tube 100 will be a variation which is reversed in polarity with respect to the voltage variation applied to its control grid 102.

The automatic level control circuits in the green and blue channels of Fig. 3 are preferably similar to the automatic level control circuit 98 in the red channel. Hence, an increase in the average density of the color film 64 will be represented by a decrease in the combined output from the multiplier phototubes 74, 76 and 78 in Fig. 3. This decrease will be in turn represented by an increase in the positive charge applied to the control grid 96 of tube 61 relative to the voltage on its cathode, and hence an increase in the intensity of the cathode ray scanning beam which will compensate at least in part for the increased density of the particular portion of the color film 64 then being scanned.

While the systems of Figs. 2 and 3 have been described in connection with the scanning of a color film, or of a color transparency, in which light from the lens 66 passes through the film or transparency, nonetheless it will be apparent that the invention is equally suited for application to a color television system in which an opaque optical image is scanned instead of a film or transparency. In this case, the polarity of the voltage applied to the control grid 96 of the cathode ray tube 61 in Fig. 3, for example, should be such that the intensity of the scanning spot produced on the screen 62 of the tube varies in inverse proportion to the average reflectance of the scanned opacity similarly as the brightness of the screen 62 had to change in direct proportion to the average density of the color film 64 as is the case in Fig. 3.

What is claimed is:

1. In a television system of the type in which an optical image is scanned by means of a spot of light produced on the luminescent screen of a cathode ray tube by impingement thereon of the cathode ray scanning beam of said tube, said cathode ray scanning beam being so deflected that the said light spot traces an image raster on said luminescent screen, and in which light representative of a point on the said optical image is separated into component colors which are respectively received by a plurality of electro-optical devices to thereby produce an instantaneous voltage output from each such electro-optical device which is normally a measure of the brilliance of one component color making up that point on the said optical image, the combination of a circuit for producing from the combined voltage outputs of the individual electro-optical devices an integrated voltage variation representative of the overall brilliance of said optical image, and a further circuit for applying the variation thus produced to control the intensity of the cathode ray scanning beam of said cathode ray tube.

2. In a television system of the type in which a succession of color transparencies are scanned by means of a spot of light produced on the luminescent screen of a cathode ray tube by impingement thereon of the cathode ray scanning beam of said tube, said cathode ray scanning beam being so deflected that the said light spot traces an image raster on said luminescent screen, and in which light representative of a point on the said optical image is separated into component colors which are respectively received by a plurality of electro-optical devices to thereby produce an instantaneous voltage output from each such electro-optical device which is normally a measure of the brilliance of one component color making up that point on the said optical image, the combination of a plurality of automatic level control circuits respectively connected to the outputs of said electro-optical devices, means for combining the respective outputs of said automatic level control circuits, and means for applying the combined outputs of said level control circuits to said cathode ray tube to control the intensity of the scanning beam thereof in substantially direct proportion to changes in the average density of successive color transparencies.

3. In a television system of the type in which a succession of opaque optical images are scanned by means of a spot of light produced on the luminescent screen of a cathode ray tube by impingement thereon of the cathode ray scanning beam of said tube, said cathode ray scanning beam being so deflected that the said light spot traces an image raster on said luminescent screen, and in which light representative of a point on the said optical image is separated into component colors which are respectively received by a plurality of electro-optical devices to thereby produce an instantaneous output from each such electro-optical device which is normally a measure of the brilliance of one component color making up that particular point on the said optical image, the combination of a plurality of automatic level control circuits respectively connected to the outputs of said electro-optical devices, means for combining the respective outputs of said automatic level control circuits, and means for applying the combined outputs of said automatic level control circuits to said cathode ray tube to control the intensity of the scanning beam thereof in substantially inverse proportion to changes in the average reflectance of successively scanned opacities.

4. In a television system, a cathode ray tube having means for producing a cathode ray beam to provide a luminous scanning raster, a subject to be analyzed by incidence of light from the luminous raster, a phototube positioned to receive light from said subject, a level control circuit associated with the output circuit of said phototube, and said level control circuit having means to apply a control signal to said cathode ray tube to vary the light output thereof.

5. In a television system, a cathode ray tube having means for producing a cathode ray beam to provide a luminous scanning raster, a control electrode in said cathode ray tube to vary the intensity of said beam, a subject to be analyzed by incidence of light from the luminous raster, a phototube positioned to receive light from said subject, a level control circuit comprising a diode and an amplifier tube having a control grid, coupling means from the output circuit of said phototube to the cathode of said diode, coupling means from the cathode of said diode to the control grid of said amplifier tube, and means for applying a control voltage variation from the output of said amplifier tube to the control electrode of said cathode ray tube.

GEORGE C. SZIKLAI.
MILTON ROSENBERG.

REFERENCES CITED

The following references are of record in the file of this patent:

UNITED STATES PATENTS

| Number | Name | Date |
|---|---|---|
| 1,946,404 | Konemann | Feb. 6, 1934 |
| 2,001,730 | Ives | May 21, 1935 |
| 2,043,245 | Harding | June 9, 1936 |
| 2,099,889 | Ives | Nov. 23, 1937 |
| 2,102,193 | Canady | Dec. 14, 1937 |
| 2,274,530 | Collins | Feb. 24, 1942 |
| 2,404,098 | Schade | July 16, 1946 |
| 2,407,485 | Essig | Sept. 10, 1946 |
| 2,431,511 | Sanders | Nov. 25, 1947 |